United States Patent [19]

Wilhelm

[11] 4,112,253
[45] Sep. 5, 1978

[54] DEVICE FOR THE TRANSMISSION OF PUSH-PULL SIGNALS ACROSS A TWO-WIRE LINE IN FULL DUPLEX OPERATION

[75] Inventor: Wilhelm Wilhelm, Munich, Germany

[73] Assignee: Siemens Aktiengesellschaft, Berlin & Munich, Germany

[21] Appl. No.: 809,808

[22] Filed: Jun. 24, 1977

[30] Foreign Application Priority Data

Jul. 22, 1976 [DE] Fed. Rep. of Germany ....... 2633066

[51] Int. Cl.² .............................................. H04L 5/14
[52] U.S. Cl. ..................................... 178/58 R; 178/59
[58] Field of Search ................... 178/58 R, 59, 60, 68, 178/70 R, 70 TS, 71 R, 73; 343/175, 176, 180; 179/15 BL

[56] References Cited

U.S. PATENT DOCUMENTS

| | | | |
|---|---|---|---|
| 2,133,832 | 10/1938 | Pullis | 178/59 |
| 3,725,582 | 4/1973 | Davis | 178/58 R |
| 3,758,719 | 9/1973 | Klose | 178/58 R |
| 3,927,257 | 12/1975 | Copenhafer | 178/60 |
| 3,983,324 | 9/1976 | Lacher | 178/59 |

FOREIGN PATENT DOCUMENTS

| | | | |
|---|---|---|---|
| 2,045,654 | 3/1972 | Fed. Rep. of Germany | 178/58 R |
| 2,142,655 | 3/1973 | Fed. Rep. of Germany | 178/58 R |

Primary Examiner—Thomas A. Robinson
Attorney, Agent, or Firm—Hill, Gross, Simpson, Van Santen, Steadman, Chiara & Simpson

[57] ABSTRACT

A device for the transmission of push-pull signals by way of a two-wire line in full duplex operation has a push-pull transmitter for the transmission of the push-pull signals to an opposite station and a push-pull receiver for the simultaneous reception of the push-pull signals transmitted from the opposite station, and a compensation circuit for compensating the push-pull signals transmitted from the associated push-pull transmitter in relation to the inputs of the push-pull receiver. The push-pull transmitter and the push-pull receiver are designed as symmetrical differential amplifiers composed of emitter-coupled transistors and are provided with a constant current feed. The compensation circuit is of symmetrical construction and inputs of the push-pull receiver are connected to the wires of the two-wire line by way of two identical decoupling resistors which form parts of the compensation circuit.

5 Claims, 5 Drawing Figures

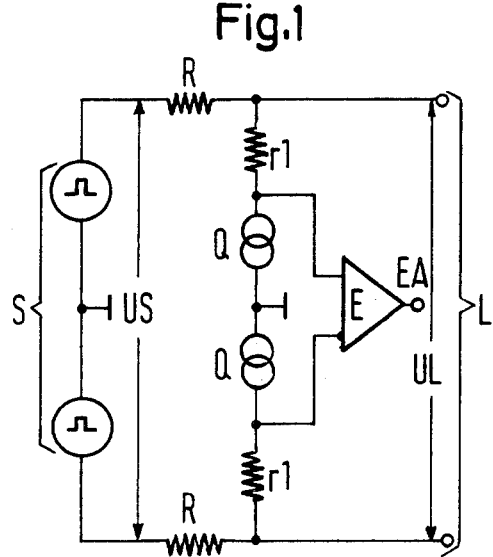
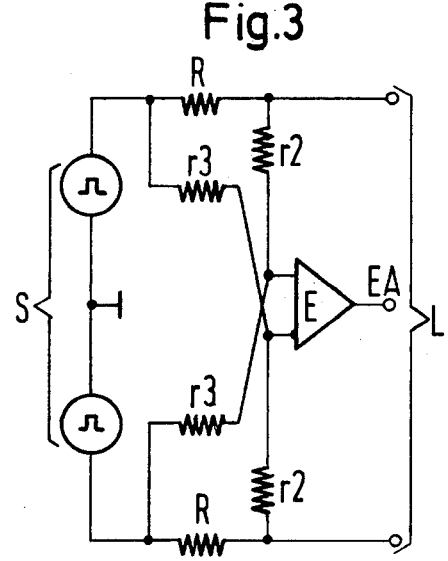
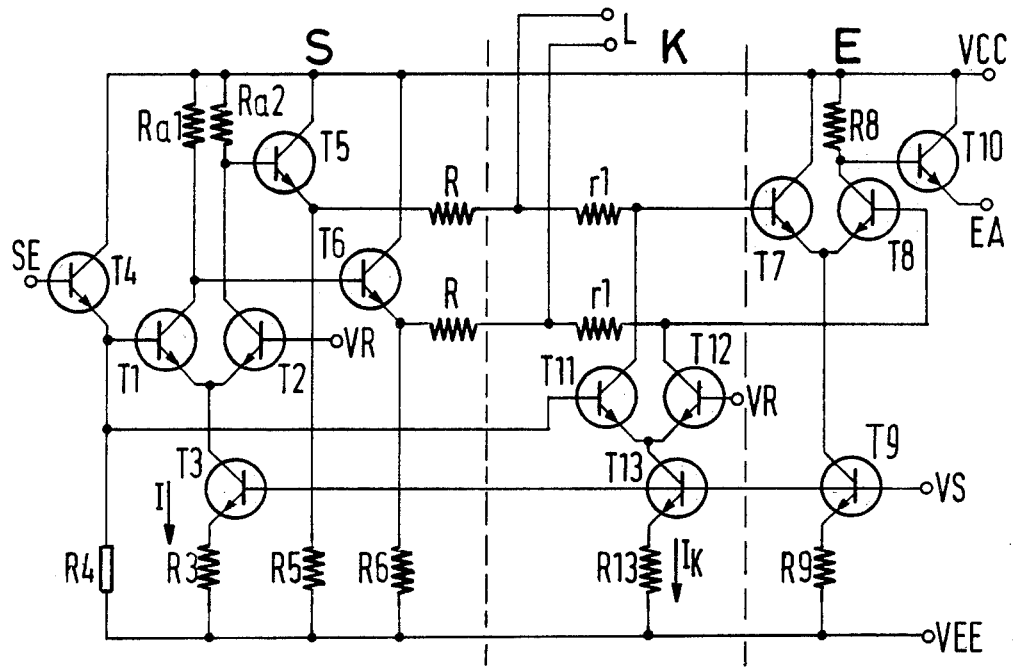

DEVICE FOR THE TRANSMISSION OF PUSH-PULL SIGNALS ACROSS A TWO-WIRE LINE IN FULL DUPLEX OPERATION

BACKGROUND OF THE INVENTION

1. Field of the Invention

The present invention relates to a device for the transmission of push-pull signals, and more particularly to such a device in which a compensation circuit is provided for the compensation of push-pull signals transmitted by a push-pull transmitter in relation to the inputs of an associated push-pull receiver.

2. Description of the Prior Art

The transmission of dc data signals between remote opposite stations for which identical ground potentials are not assured, is primarily carried out with the aid of push-pull signals across two-wire transmission lines. Differences and mutual fluctuations in the ground potentials then influence the pair of lines as push-pull disturbances, and can be neutralized by a receiver having push-pull suppression facilities. A disadvantage of such an arrangement resides in the fact that two lines, in respect of each transmission direction, are required for every signal. Since it is necessary to transmit a plurality of data signals in parallel, in particular between data processing systems or between the central unit and the periphery of the system, a considerable expense is involved in respect of lines and connecting plugs.

The line requirement can be reduced with the aid of devices which facilitate data transmission in both directions across a two-wire transmission line, i.e. full duplex operation. In this case it is necessary to prevent the output signal of a transmitter from reaching the assoicated receiver. It has long been known to interpose the transmitter and receiver of every opposite station into the diagonals of a bridge circuit, and to arrange the two-wire transmission line and a balancing line into two adjacent bridge arms. However, this type of bridge circuit has the disadvantage that only a small part of the transmitter power is applied to the transmission line, and likewise only a small portion of the power of the incoming signal is available at the receiver input.

The German published application No. 2,045,654 discloses a circuit arrangement for the full duplex transmission of dc data signals by way of a two-wire transmission line, wherein the transmitter, a compensation circuit, and the receiver are connected in series to the two-wire transmission line. The output signal of the compensation circuit compensates the signal from the associated transmitter which would otherwise be applied to the receiver. The compensation circuit has a comparatively complicated construction in order to be able to balance deformations of the transmitted signal, as a result of the generally complex input impedances of long, and therefore dissipative transmission lines. However, the compensation circuit can be considerably simplified if only lines whose input impedances are real, with good approximation, are used.

The series arrangement of transmitter, receiver and compensation circuit in the known transmission device gives rise to asymmetry in respect of ground potentials, which is very harmful. This applies in particular to the two-wire transmission line. Fed-in interference voltages now become manifest as push-pull interferences, which can no longer be eliminated by a receiver which has good push-push suppression facilities.

SUMMARY OF THE INVENTION

The object of the present invention, therefore, is to provide a device of the type referred to above, hereinafter simply referred to as a transmission device, which device is strictly symmetrical in respect of the assigned ground potential. Furthermore, the device is to be integrable and ECL compatible, i.e. it is to be able to be used in association with networks constructed in the ECL technique (emitter coupled logic technique) without altering the signal range of the signal which controls the push-pull transmitter, or the signal which is emitted from the push-pull receiver. The integration requirement gives rise to a power loss and a dispensation with transformers, inductances and capacitances, unless the inductances and capacitances are otherwise unavoidable as parasitic parameters. However, this results in the fact that the distances which can be bridged are limited to values at which the two-wire lines employed are still sufficiently loss-free, in order to be able to meet the requirement that their surge impedance should be, with good approximation, real. In this case, as is well known in the art, no reflections occur when the lines are terminated with real impedances of the value of the characteristic impedance.

According to the invention, the foregoing object is realized, in a circuit of the type described above, in that the push-pull transmitter and the push-pull receiver are designed as symmetrical differential amplifiers composed of emitter-coupled transistors having a constant feed-in of current, and the compensation circuit is of symmetrical construction, and further that the inputs of the push-pull receiver are connected to the wires of the two-wire line by way of two identical decoupling resistors which form parts of the compensation circuit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram which illustrates an exemplary embodiment of a transmission device constructed in accordance with the present invention;

FIG. 2 is a detailed schematic circuit diagram of the embodiment illustrated in FIG. 1;

FIG. 3 is a schematic diagram of a second exemplary embodiment of the invention;

DESCRIPTION OF THE PREFERRED EMBODIMENTS

Figure 4:
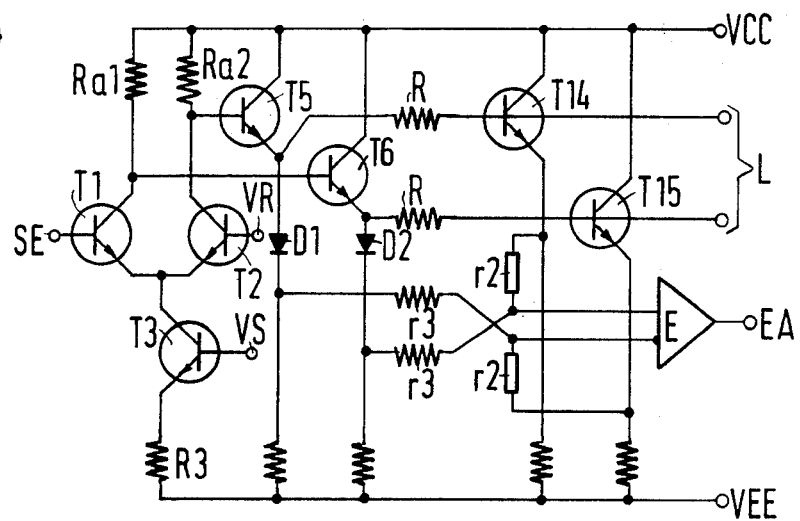
FIG. 4 is a detailed schematic circuit diagram of the embodiment illustrated in FIG. 3.

Referring to FIG. 1, a transmitter S is divided into two (keyed) sources of constant voltage, which are symmetrical with respect to ground potential, and which together supply a signal having an amplitude US. Two line terminating resistors R, whose values each correspond to half the characteristic impedance of the line L are also symmetrically arranged. Because of the similar termination of the line at the opposite station, the signal amplitude UL on the two-wire line L amounts to half the signal amplitude US. The two inputs of the push-pull receiver E, which has an output EA, are connected by way of decoupling resistors r1 to the two wires of the two-wire line L. The values of the decoupling resistors r1 are approximately 5-10 times as high as the values of the line terminating resistors R. As the input impedance of the push-pull receiver E can again be assumed to be extremely high-ohmic in comparison to the values of the resistors r1, without the provision of additional measures the signal fed-in from the associated transmitter to the two-wire line L would be connected, in full, to the push-pull receiver, and thus disturb the reception of the signal transmitted from the opposite station. In order to prevent this undesirable situation, two sources Q are provided which are impressed with a current, and which alternately transmit a current $I_k$ through the resistors r1, and are switched over with the same timing as the transmitted signals. The switch-on sequence of the currents $I_K$ and the magnitude of these currents are selected to be such that across one of the series resistors r1 there occurs, in each case, a voltage drop which is equal in magnitude, but oppositely directed to the signal amplitude UL on the line L. In this manner the signal produced by the associated transmitter S is eliminated in respect of the inputs of the push-pull receiver E.

FIG. 2 illustrates an exemplary embodiment of the transmission device, which is governed by the basic principle described above with respect to the apparatus of FIG. 1. The circuit arrangement in FIG. 2 is divided into three sections by two perpendicular, broken lines. The left-hand section illustrates the push-pull transmitter S, which contains a differential amplifier comprising two emitter-coupled transistors T1 and T2. The emitters of the two transistors are connected to the collector of a further tansistor T3 having a base which is connected to a fixed auxiliary potential VS. The transistor T3 acts as a source of an impressed current I, the magnitude of which is determined by the value of its emitter resistor R3. Following a level shift by the emitter follower comprising a transistor T4 and an emitter resistor R4, the transmitter input signal which is connected to the terminal SE controls the differential amplifier of the transmitter by way of the base of the transistor T1. The base of the other transistor T2 is connected to a further auxiliary potential VR, the magnitude of which is approximately equal to the mean value of the two binary signal values of the control signal connected to the base of the transistor T1. The emitter follower, comprising the transistor T4 and the resistor R4, can also be omitted if the magnitude of the auxiliary potential VR is adapted accordingly, in which case the input terminal SE is then directly connected to the base of the transistor T1 of the differenital amplifier.

The collectors of the transistors T1 and T2 are connected to further transistors T5 and T6 in an emitter follower circuit. The emitters of the transistors T5 and T6 are connected by way of line terminating resistors R having a value which corresponds at least approximately to half the characteristic impedance of the two-wire line L, to the wires of the line L.

The push-pull receiver E comprises, in a well known manner, a differential amplifier which includes a transistor T7 and a transistor T8, whose emitters are connected to one another and are supplied with an impressed current which is formed with the aid of a transistor T9 and a resistor R9. The voltage which occurs across the resistor R8, which is interposed as a load resistance in the collector circuit of the transistor T8, controls the transistor T10 which is connected as an emitter follower. The emitter of the transistor T10 is connected to the output terminal EA, from which the received signals can be withdrawn as push-push signals. The inputs of the push-pull receiver E, which are identical to the base terminals of the transistors T7 and T8, are connected to the two-wire line L by way of a pair of decoupling resistors r1. The value of the decoupling resistors r1 is approximately 5-10 times that of the characteristic impedance of the two-wire line L.

The decoupling resistors r1 form part of a compensation circuit K which contains a further differential amplifier composed of emitter-coupled transistors T11 and T12. The base of the transistor T12 is connected to the auxiliary voltage VR. The base of the transistor T11, like the base of the transistor T1 of the differential amplifier of the push-pull transmitter E, is connected to the emitter of the transistor T4. If the emitter follower circuit with the transistor T4 is omitted, the input signal of the push-pull transmitter is also directly connected to the base of the transistor T11. The particular conductive transistor T11 or T12 of the differential amplifier in the compensation circuit K switches through the impressed current $I_K$ of a current source which comprises a transistor T13 and a resistor R13, so that a voltage drop is produced in each case across one of the two decoupling resistors r1. By means of suitable adaption of the values of the decoupling resistors r1 and the magnitude of the impressed current $I_K$, it can be ensured that the voltage drop across the particular current-carrying decoupling resistor r1 is exactly equal to the amplitude UL of the transmitted signal fed-in to the two-wire line L from the associated push-pull transmitter S. If, by correct connection of the collectors of the transistors T11 and T12 to the inputs of the push-pull receiver E, it is now ensured that the voltage drop across the relevant decoupling resistors r1 is in fact opposite to the simultaneously occurring signal value of the transmitted signals of the associated push-pull transmitter, a complete compensation can be effected in respect of the input of the push-pull receiver E. Assuming that the two-wire line L is likewise terminated in accordance with its characteristic impedance at the other end, this may be carried out for the relationship $$I_K = I(Ra/2rl)$$

where Ra is the value of the load resistances Ra1 and Ra2 in the collector circuits of the transistors T1 and T2 in a differential amplifier of the push-pull transmitter S, and I is the collector currents of the transistors T1 and T2.

FIG. 3 illustrates a further exemplary embodiment of the transmission device for the transmission of push-pull signals corresponding to the present invention. As in FIG. 1, the push-pull transmitter is again formed by two alternatingly connected sources having an impressed current. They feed the transmitted signal, having the amplitude UL, to the two-wire line L by way of the line terminating resistors R, which are connected between the sources and the wires, and which have a value corresponding to half the characteristic impedance of the two-wire line. The two input terminals of the push-pull receiver E are connected by way of decoupling resistors r2 to the wires of the two-wire line. Furthermore, the input terminals of the push-pull receiver E are connected by way of further resistors r3 to the outputs of the push-pull transmitter S. When the series resistors r3 are connected, a transposition is effected relative to the line of symmetry determined by the design of the push-pull transmitter S, the push-pull receiver E, and the two-wire line L. The values of the decoupling resistors r2 are again to be equal to approximately 5-10 times the characteristic impedance of the two-wire line L. If it is again assumed that the two-wire line L is terminated at the opposite station in accordance with its characteristic impedance, the output signals from the associated push-pull transmitter S do not reach the inputs of the push-pull receiver E, if the values of the resistors r3 are twice the values of the decoupling resistors r2.

With the further assumption that the losses on the two-wire line L are negligible, the amplitude of the signals received from the opposite station at the input terminals of the push-pull receiver E amounts to 67% of the amplitude with which these signals are fed onto the two-wire line L at the opposite station.

FIG. 4 illustrates a further exemplary embodiment of the compensation circuit based on the principle represented in FIG. 3. In this embodiment, the decoupling resistors r2 are themselves decoupled from the wires of the two-wire line L by a pair of transistors T14 and T15 which are operated as emitter followers. In order to compensate for the potential shift which is caused by the base emitter paths of these transistors, a pair of diodes D1 and D2 are inserted between the corresponding connection points of the resistors r3 and the emitters of the transistors T5 and T6, which form the outputs of the push-pull transmitter. Because of the availability of the emitter followers which include the transistors T14 and T15, and the low-ohmic outputs of the push-pull transmitter, it is no longer necessary for the values of the resistors to be high in relation to the characteristic impedance of the two-wire line L. This results in shorter signal transit times between the two-wire line L and the input terminals of the push-pull receiver E.

Figure 5:
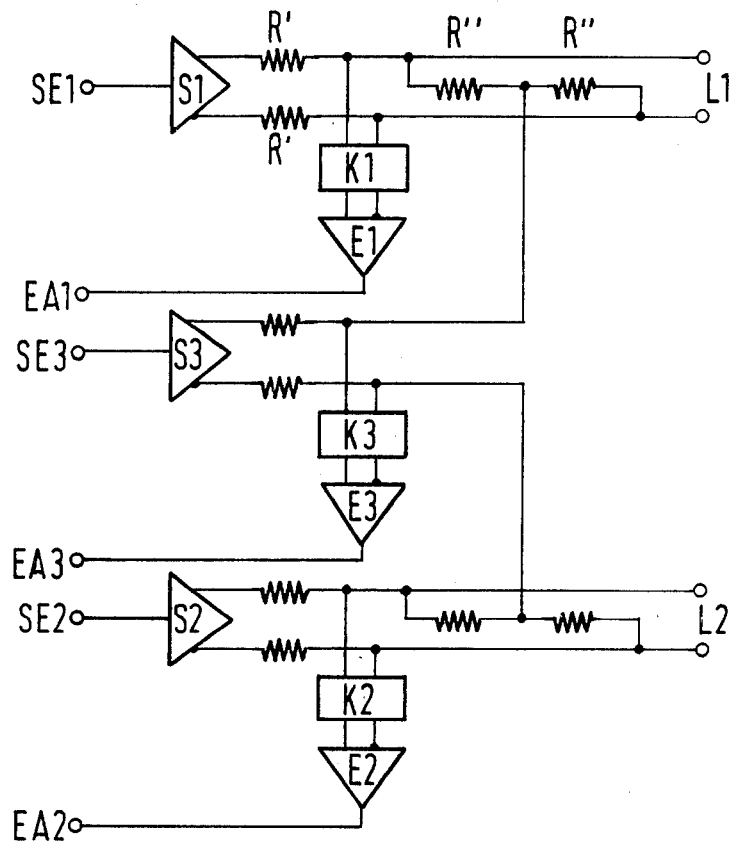
FIG. 5 is a schematic representation of the transmission devices, combined to form an integrated module, for full duplex operation by way of a phantom four-wire unit.

A further economy can be achieved, with respect to lines, by the formation of a so-called phantom four-wire element, which constitutes a measure generally known in data transmission technology. In this manner it is possible to connect three pairs of opposite stations to one another by way of two physical two-wire lines (four wires). As in the present situation all the devices which serve to transmit push-pull signals are to be integrable, which has already been referred to in the introductory portion of this paper, it is not possible to employ transformers to form the phantom four-wire unit. FIG. 5 illustrates a possibility of connecting a third transmission device, comprising a push-pull transmitter S3, a push-pull receiver E3, and a compensation circuit K3 to two physical two-wire lines L1 and L2, along with the first station having a push-pull transmitter S1, a push-pull receiver E1 and a compensation circuit K1, and a second station having a push-pull transmitter S2, a push-pull receiver E2 and a compensation circuit K2. The devices which are illustrated in FIG. 5 and serve for transmission and reception of, in each case, three independent signals in both directions are advantageously integrated in one module.

It should be noted that the values of the balancing resistors R", which are necessary for the formation of the third transmission path, must be taken into consideration in dimensioning of the line terminating resistors, here reference R'. If the values of the balancing resistors R" and the values of the line terminating resistors R' are selected to be equal to one another, these must also be equal to the characteristic impedances of the two-wire lines. The line terminating resistors of the third transmission device S3, E3 and K3 can be omitted if the transmission device is constructed in the manner illustrated in FIGS. 1 and 2. In this case, the line terminating resistors fundamentally have no influence on the effectiveness of the compensation circuit. However, the impressed current $I_K$ should be increased to twice the former value.

Although I have described my invention by reference to certain illustrative embodiments thereof, many changes and modificiations of the invention may become apparent to those skilled in the art without departing from the spirit and scope of the invention. I therefore intend to include within the patent warranted hereon, all such changes and modifications as may reasonably and properly be included within the scope of my contribution to the art.

I claim:

1. In a device for the transmission of push-pull signals over a two wire line in full duplex operation in which a push-pull transmitter is connected to the line and operable for the transmission of push-pull signals to an opposite station, a push-pull receiver is associated with the transmitter and coupled to the line for the simultaneous reception of the push-pull signals transmitted from the opposite station, and a compensation circuit is connected to the line and to the receiver for compensating the push-pull signal transmitted from the associated push-pull transmitter in relation to the inputs of the push-pull receiver, the improvement wherein:

said push-pull transmitter and said push-pull receiver each include a differential amplifier, each of said differential amplifiers including emitter-coupled transistors and a constant current feed to said emitter-coupled transistors; and said compensation circuit is of symmetrical construction and includes a pair of identical decoupling resistors which connect the inputs of said push-pull receiver to respective wires of the two wire line, and means for feeding currents to said decoupling resistors alternately and in the operating sequence of the push-pull transmitter to cause volate drops across said decoupling resistors which are equal in magnitude and in opposite direction to the signal amplitude placed on the two-wire line by the push-pull transmitter.

2. The improved device set forth in claim 1, wherein:
said push-pull transmitter includes a pair of emitter followers connecting opposite branches of said differential amplifier of said transmitter to respective wires of the two-wire line in order to provide a low internal impedance at the outputs of the transmitter, and a pair of line terminating resistors, each serially interposed between an emitter follower and the respective wire of the two-wire line.

3. In the improved device set forth in claim 1, wherein:
said means for feeding current to said decoupling resistors comprises a constant current source and a pair of electronic switches connected between said constant current source and respective ones of said decoupling resistors, at least one of said electronic switches connected to the transmitter and said electronic switches operated in response to the operation of the transmitter so that the constant current is fed to said decoupling resistors in synchronism with the push-pull signals transmitted by the push-pull transmitter.

4. The improved device set forth in claim 1, and further defined, in combination therewith, as comprising:
  a pair of further resistors, each of said further resistors connecting an input terminal of the push-pull receiver and the decoupling resistor connected to that terminal to the output of the push-pull transmitter which is opposite of that to which the decoupling resistor is connected, each of said further resistors having a resistance value which is twice the value of a decoupling resistor.

5. The improved device set forth in claim 4, and further defined as comprising:
  a pair of emitter followers, each including a transistor connected to a respective wire of the two-wire line and an emitter resistor, said decoupling resistors being connected between the input terminals of the push-pull receiver and respecitve junctions of the emitter follower transistors and emitter resistors; and
  a pair of diodes connected in series with respective ones of said further resistors and poled in the forward direction to compensate for the potential shift caused by the base-emitter paths of said emitter follower transistors.

* * * * *